United States Patent [19]

Sayles

[11] Patent Number: 5,525,372

[45] Date of Patent: Jun. 11, 1996

[54] METHOD OF MANUFACTURING HYBRID FIBER-REINFORCED COMPOSITE NOZZLE MATERIAL

[75] Inventor: David C. Sayles, Huntsville, Ala.

[73] Assignee: The United States of America as represented by the Secretary of the Army, Washington, D.C.

[21] Appl. No.: 295,172

[22] Filed: Aug. 22, 1994

Related U.S. Application Data

[63] Continuation of Ser. No. 941,818, Sep. 8, 1992, abandoned.

[51] Int. Cl.$^6$ ................................................ C23C 16/32
[52] U.S. Cl. ................................. 427/255.4; 427/249
[58] Field of Search ........................... 427/255.4, 249, 427/255

[56] References Cited

U.S. PATENT DOCUMENTS

| | | | |
|---|---|---|---|
| 3,808,087 | 4/1974 | Milewski et al. | 427/249 |
| 4,513,030 | 4/1985 | Milewski | 427/249 |
| 4,837,073 | 6/1989 | McAllister et al. | 427/343 |
| 4,976,899 | 12/1990 | Rousseau et al. | 427/249 |
| 5,017,527 | 5/1991 | June-Gunn et al. | 427/249 |
| 5,067,999 | 11/1991 | Streckert et al. | 427/419.8 |
| 5,286,565 | 2/1994 | Holzl et al. | 427/279 |
| 5,298,311 | 3/1994 | Bentson et al. | 428/216 |
| 5,326,595 | 7/1994 | Shuford | 427/376.2 |
| 5,330,789 | 7/1994 | Booth et al. | 427/204 |

*Primary Examiner*—Shrive Beck
*Assistant Examiner*—Bret Chen
*Attorney, Agent, or Firm*—Anthony T. Lane; Hugh P. Nicholson; Freddie M. Bush

[57] ABSTRACT

The conversion of carbon-carbon of a composite material at the surface to silicon carbide-hybridized carbon-carbon in accordance with the method of invention is accomplished by reacting the carbon fibers and matrix with silicon monoxide at elevated temperature from about 1500°–1700° C. The conversion of bulk graphite or carbon-carbon composite materials is achieved in 30–60 minutes at 1700° C. With conversion the density is increased from the density of carbon of 1.45 grams/cc to that of silicon carbide of 3.21 grams/cc. The method of reaction in the vapor phase of silicon monooxide with the carbon-carbon bond releases a C atom in exchange for the Si atom with a release of CO from the composite material. Photomicrographic studies indicates a depth of conversion from about 50 to 100 mils. The reaction rate of silicon monooxide increases with increased temperature; therefore, to avoid too rapid a release of the by-product carbon monooxide which might damage the composite material in its escape, the reaction temperature should not exceed 1700° C.

4 Claims, 13 Drawing Sheets

CONVERSION FRONT (HIGH SELECTIVITY)

TRANSVERSE FIBER 1/3 SiC, 2/3 C
FIGURE 12

FIGURE 13

METHOD OF MANUFACTURING HYBRID FIBER-REINFORCED COMPOSITE NOZZLE MATERIAL

DEDICATORY CLAUSE

The invention described herein may be manufactured, used, and licensed by or for the Government for governmental purposes without the payment to me of any royalties thereon.

This is a application continuation, of application Ser. No. 07/941,818, filed Sep. 8, 1992, now abandoned.

BACKGROUND OF THE INVENTION

In obtaining thrust from a rocket motor, the constricted section of the exhaust nozzle or throat section is designed to provide a predetermined exhaust gas flow rate at a defined combustion chamber pressure. After the exhaust gases exit the throat section, the gases are expanded through an expansion exit cone to provide thrust based on the total rocket motor design. The throat area and the other sections of the exhaust nozzle must be able to withstand the high temperatures of the exhaust gases; otherwise, erosion by the hot exhaust gases, particularly in the throat area, will cause change in the combustion chamber pressure and burning rate and the total thrust delivered.

State-of-the-art materials which have been used in nozzle throat fabrication are; carbon-phenolic composites, carbon-carbon composites, bulk graphite, pyrolytic graphite, etc. Generic carbon-carbon composites perform well when exposed to motor exhaust gases which are at low flame combustion temperatures, but are not adequate in a high flame temperature environment. The reason is that above 2000° C. temperature environment carbon reacts with the water and carbon dioxide which are present in the exhaust gases. The rate of these reactions increases as the temperature increases.

To reduce the erosion as a result of this chemical reaction, the state-of-the-art nozzle throats have been designed to have nozzle throats of very high temperature erosion-resistant metals, such as, rhenium, hafnium, tungsten, zirconium as coating materials. These have serious limitations, such as, nuclear sensitivity, brittleness, cracking, and flaking off.

A need exists for changing the surface of the carbon-carbon composite material of the nozzle throat area to enable it to withstand higher temperatures while retaining the desirable features of a carbon-carbon substrate backup material of the nozzle.

An object of this invention is to provide a method for converting the near surface of the carbon-carbon composite material at the surface of the interceptor nozzle throat to be more heat resistant.

A further object of this invention is to provide a method of manufacture for surface conversion of a carbon-carbon composite nozzle material to an erosion resistant surface.

Still a further object of this invention is to provide a method for the conversion of bulk graphite to a more heat resistant form to a more chemical-resistant form which is less subject to erosion in a rocket nozzle throat environment.

SUMMARY OF THE INVENTION

The conversion of carbon-carbon of a composite material with an exposed outer surface for conversion into silicon carbide-hybridized carbon-carbon in accordance with the invention is accomplished by reacting the carbon fibers and matrix with silicon monoxide at elevated temperatures. The silicon monoxide is produced by the reaction of liquid silicon with gaseous silicon dioxide. The silicon monoxide then reacts with carbon in the exposed outer surface to form solid silicon carbide and carbon monoxide. Total conversion of bulk graphite or carbon-carbon composite materials is accomplished in 30–60 minutes at 1700° C. At lower temperatures, for example at 1500° C., graphite was found to resist conversion, but carbon would undergo conversion.

The method is effective for the conversion of the surface and the near surface of the carbon-carbon composite material of the interceptor nozzle throat into silicon carbide. Because of the higher chemical and thermal resistance of silicon 5 carbide, a higher density, more chemically-resistant surface is formed on the nozzle throat while the substrate backup material remains unaffected and continues to remain as carbon-carbon composite. This substrate carbon-carbon backup material provides the structural support and is of lower density, which is a very desirable characteristic. To carry out the conversion of carbon to silicon carbide, the carbon has to be infiltrated by the silicon monoxide. When this reaction occurs, carbon atoms are exchanged for silicon atoms, and the reaction proceeds until silicon carbide is formed in stoichiometric amounts. With conversion, the density is increased from the density of carbon of 1.45 g/cc to that of silicon carbide of 3.21 g/cc.

The chemical reactions which are involved in the conversion method described above are summarized below as follows: 1. $Si\ (liquid) + SiO_2\ (gaseous) \rightarrow 2SiO\ (vapor)$ 2. $2SiO\ (vapor) + 2C\ (solid) \rightarrow SiC\ (solid) + CO\ (gaseous)$.

DESCRIPTION OF THE PREFERRED EMBODIMENT

The conversion of carbon-carbon of composite material at the near surface (e.g., 50 to 100 mils in depth) to silicon carbide-hybridized carbon-carbon is achieved by reacting fibers and matrix of composite material at elevated temperatures from about 1500° C. to about 1700° C. with silicon monoxide vapor to change the C—C to silicon carbide-hybridized carbon-carbon. With this conversion, the density is increased from the density of carbon of 1.45 grams/cc to that of silicon carbide of 3.2 grams/cc. In carrying out the conversion of carbon to silicon carbide, the carbon has to be infiltrated by the silicon monoxide, but the by-product, carbon dioxide, which is produced, must diffuse out of the substrate at not too rapid a rate. If it is allowed to diffuse out at too rapid a rate, this could result in structural damage. To effectively control the conversion of carbon to silicon carbide, the temperature should be not over 1700° C., otherwise, the rate of carbon dioxide production tends to exceed the safe diffusion rate out of the substrate.

Since carbon-carbon composite materials contain several different types of carbon compounds, there is a degree of selectivity as to the extent of the conversion reaction to the silicon carbide that is formed. The greater the graphite content is in the carbon-carbon composite, the fewer are the carbon atoms that are located at the edge of the graphite planes in the carbon crystallites. As a result, a lesser chemical reaction occurs with the graphitic carbon sites.

Figure 1:
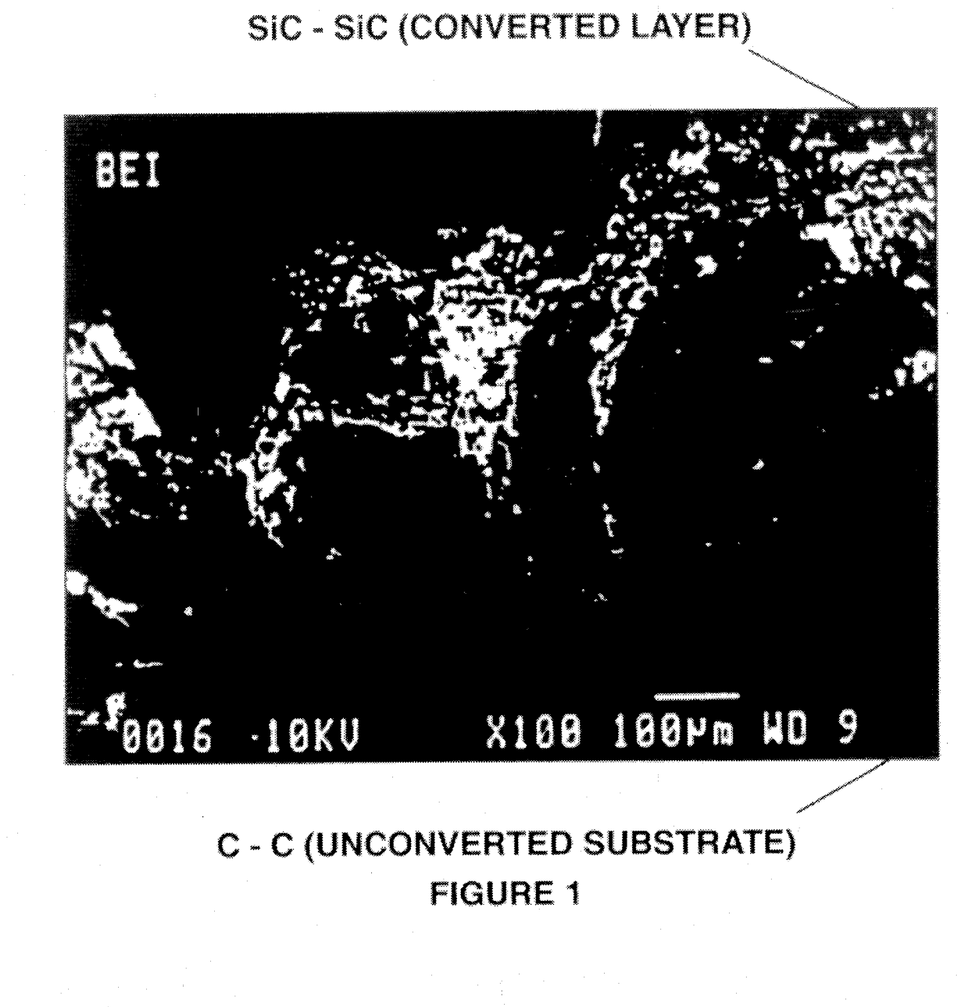
FIG. 1 depicts the microstructure and composite unit cell Scanning Electron Micrograph of silicon carbide-silicon carbide/carbon-carbon composite material magnified 100× to show SiC—SiC (converted white layer) and C—C (unconverted black layer).
Figure 9:
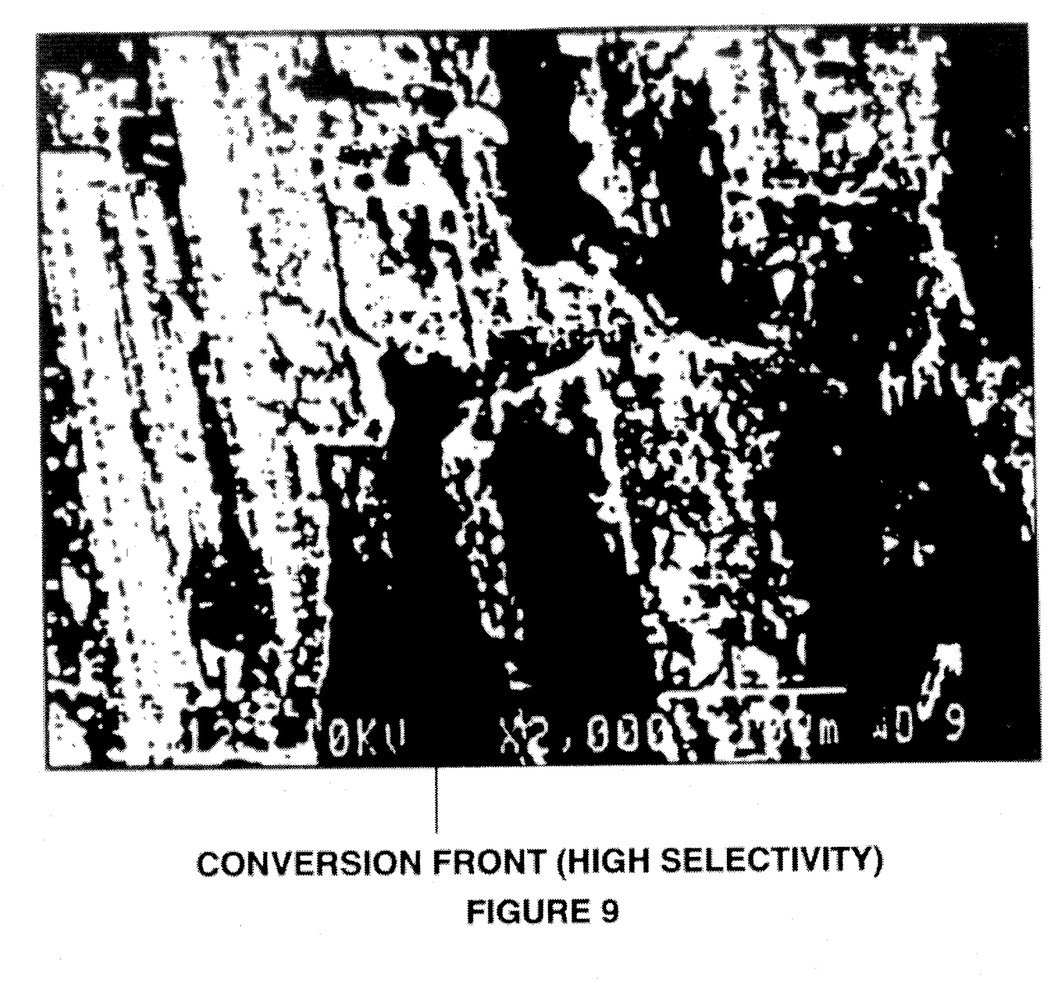
Figure 10:
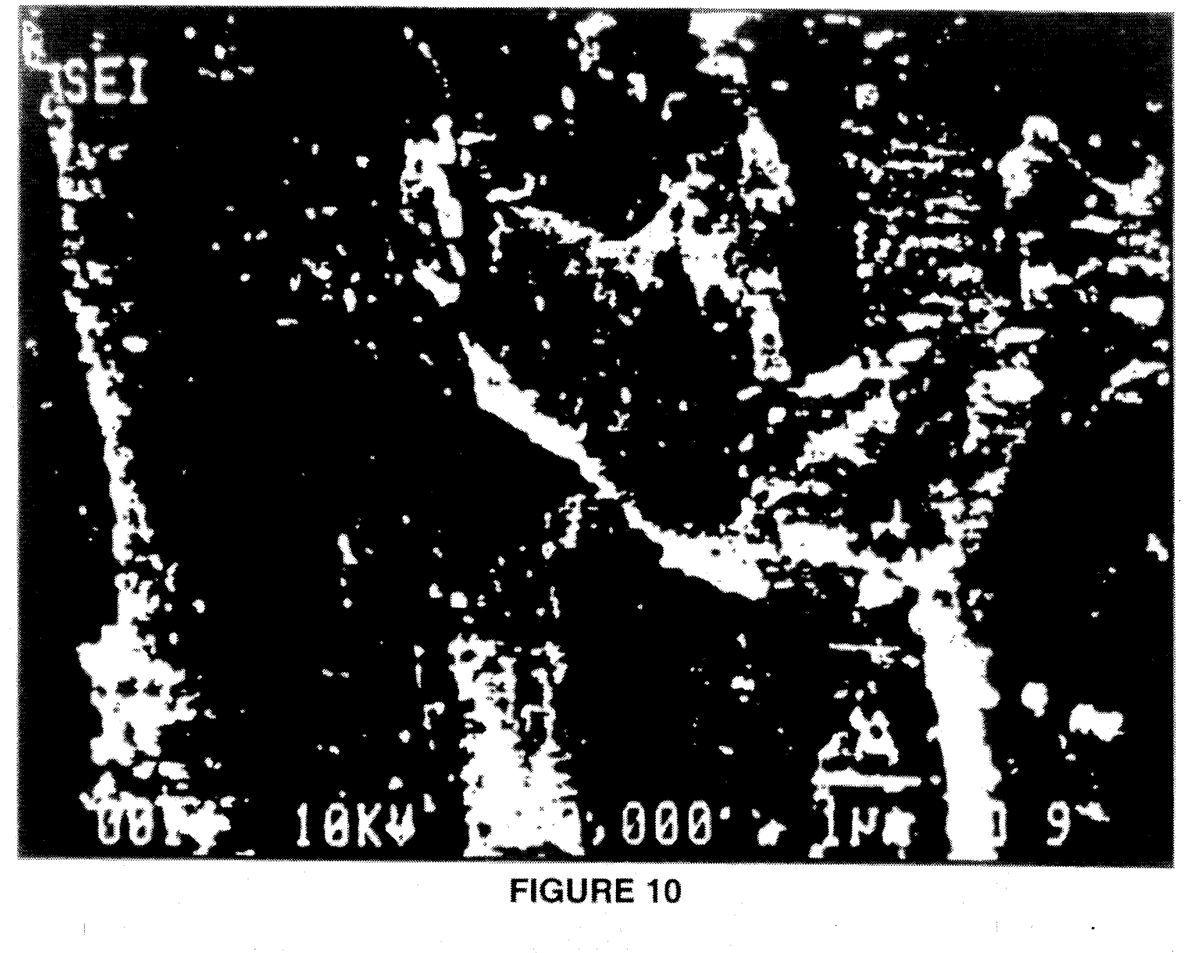
FIGS. 10, 11, 12, and 13 depict the conversion front microstructure in fiber (transverse and longitudinal) orientations magnified 10,000×.
Figure 11:
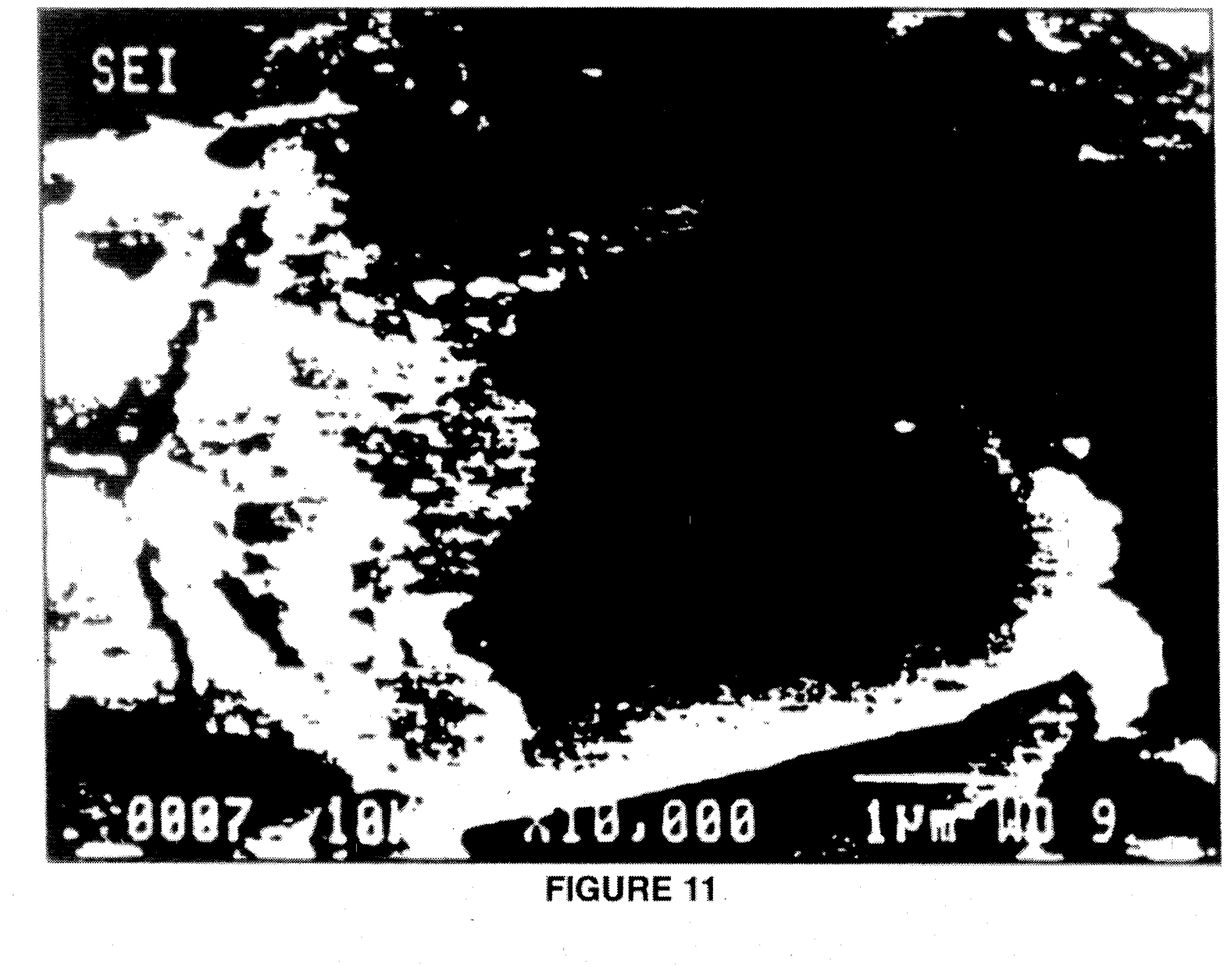
Figure 12:
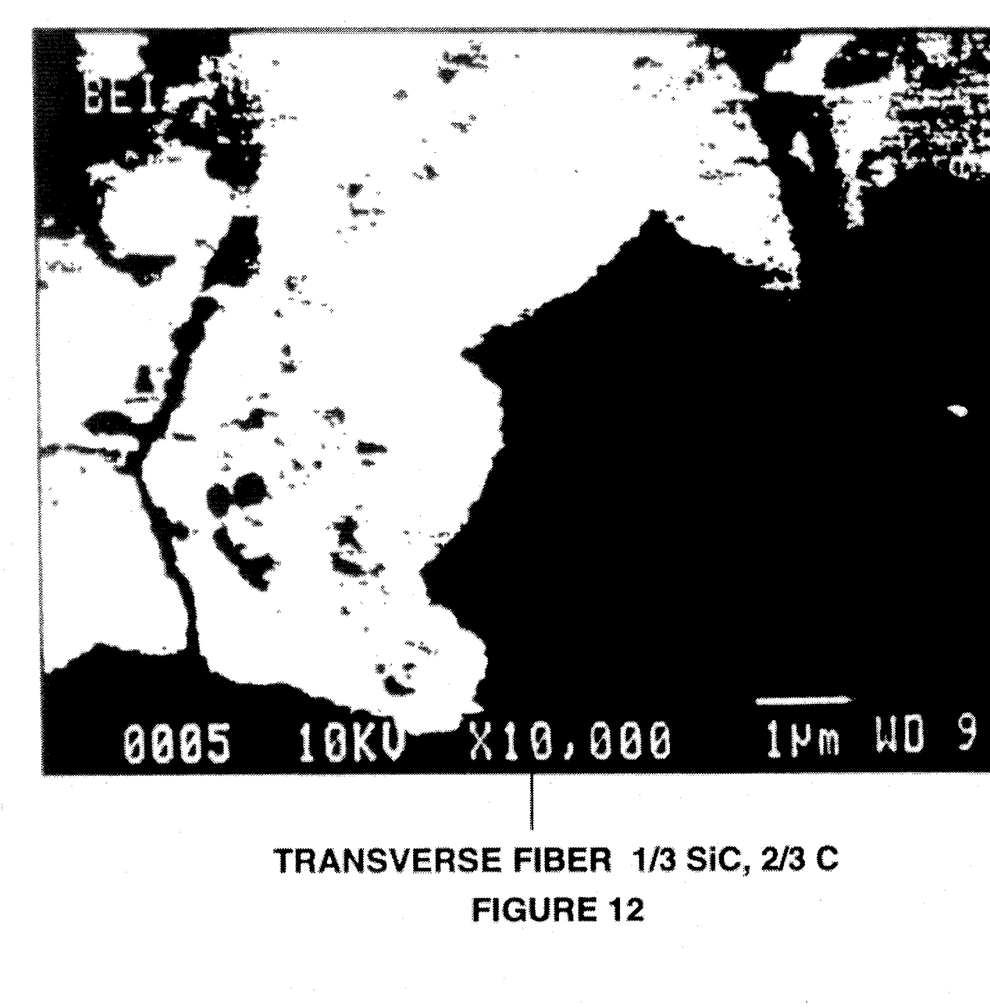
Figure 13:
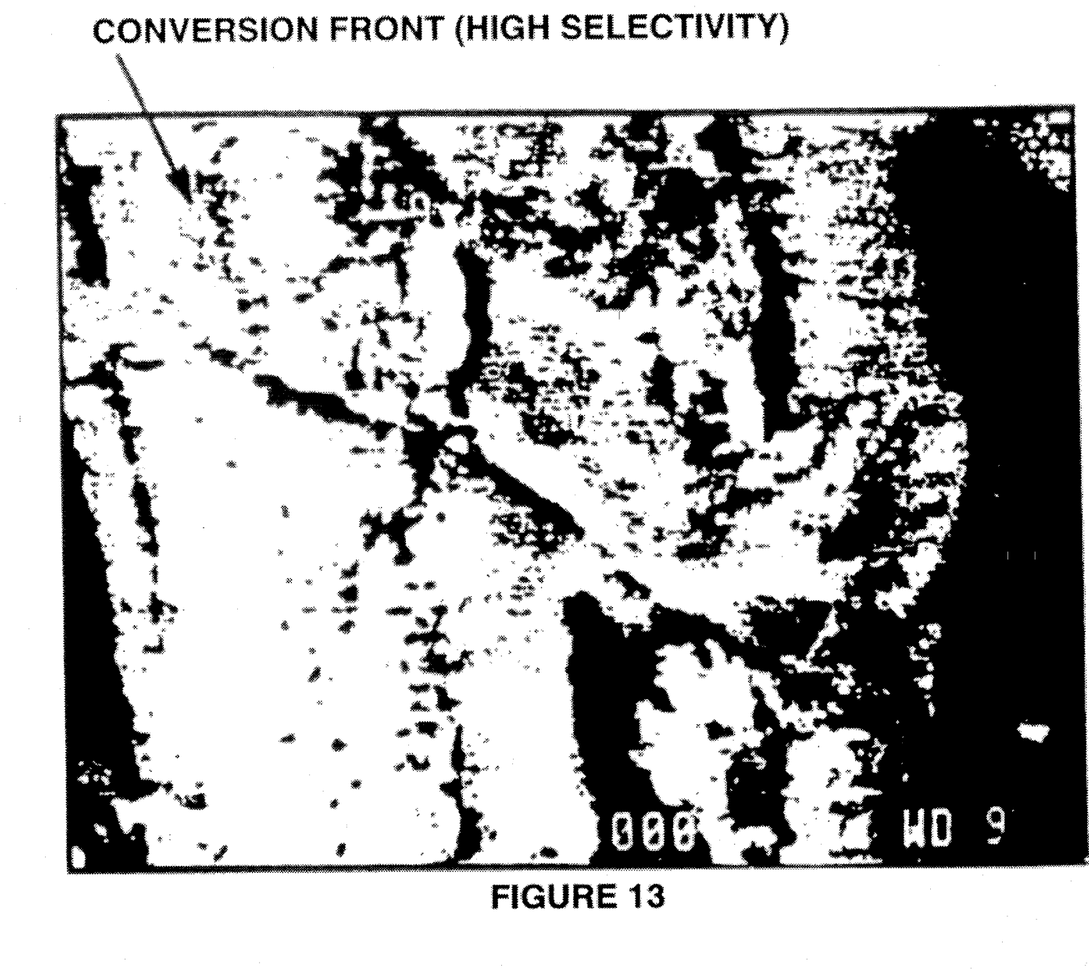

The Figures of the Drawing depict changes of conversion at the near surface of a composite structure. For convenience in reviewing Scanning Electron Micrographs in FIGS. 1–12 relative distances are represented at various magnifications of 100×, 500×, 2000× and 10,000× to permit a viewer a proper perspective of the micrographs. For example, FIG. 1 is 100× and the depicted distance is 100 micrometers or 100 microns. Relative distances of FIGS. 2–5 are 10 micrometers, respectively. Relative distances of FIGS. 6–9 are 10 micrometers, respectively. Relative distances of FIGS. 10–12 are 1 micrometer, respectively. The surface layer of the hybrid composite as examined by Scanning Electron Microscope (with and without backscatter) at different levels of magnifications (100×, FIG. 1 and 500×, FIGS. 2 and 3), reveals evidence of the type of conversion, seen by the deep, irregular penetration of the silicon monoxide along the conversion surface. The overall surface microstructure of the silicon carbide-silicon carbide layer is shown in FIG. 1. Here evidence of the deep, irregular penetration of the silicon can be observed. Thus, any cracks which exist in the carbon-carbon composite structure lend themselves to being readily converted into silicon carbide.

Figure 2:
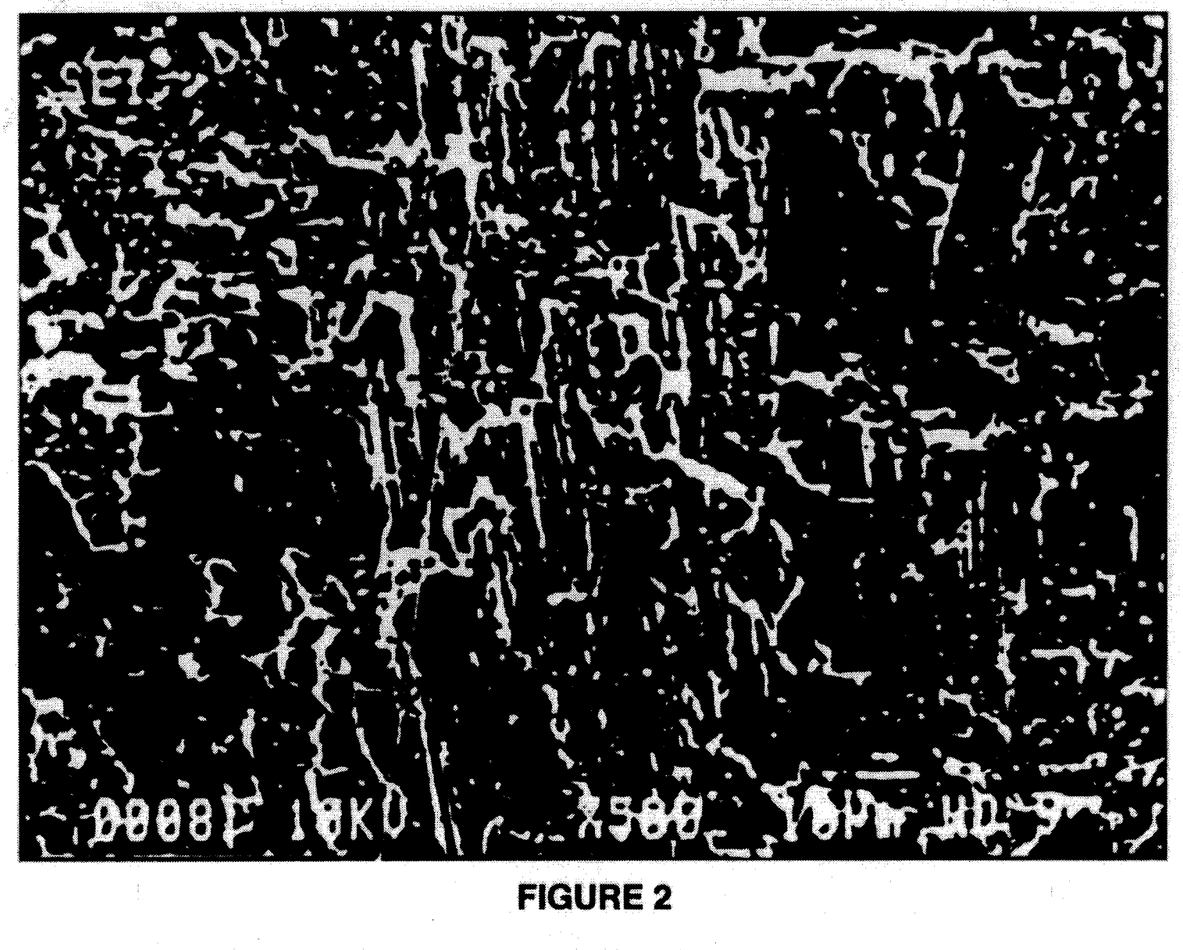
FIGS. 2 and 3 depict the microstructure and composite unit cell Scanning Electron Micrographs of silicon carbide-silicon carbide/carbon-carbon composite material magnified 500× to show transverse and longitudinal SiC fibers and transverse and longitudinal carbon.

At 500× magnification, as shown in FIG. 2, the region of conversion to silicon carbide, the transverse and longitudinal fibers become readily visible.

Figure 3:
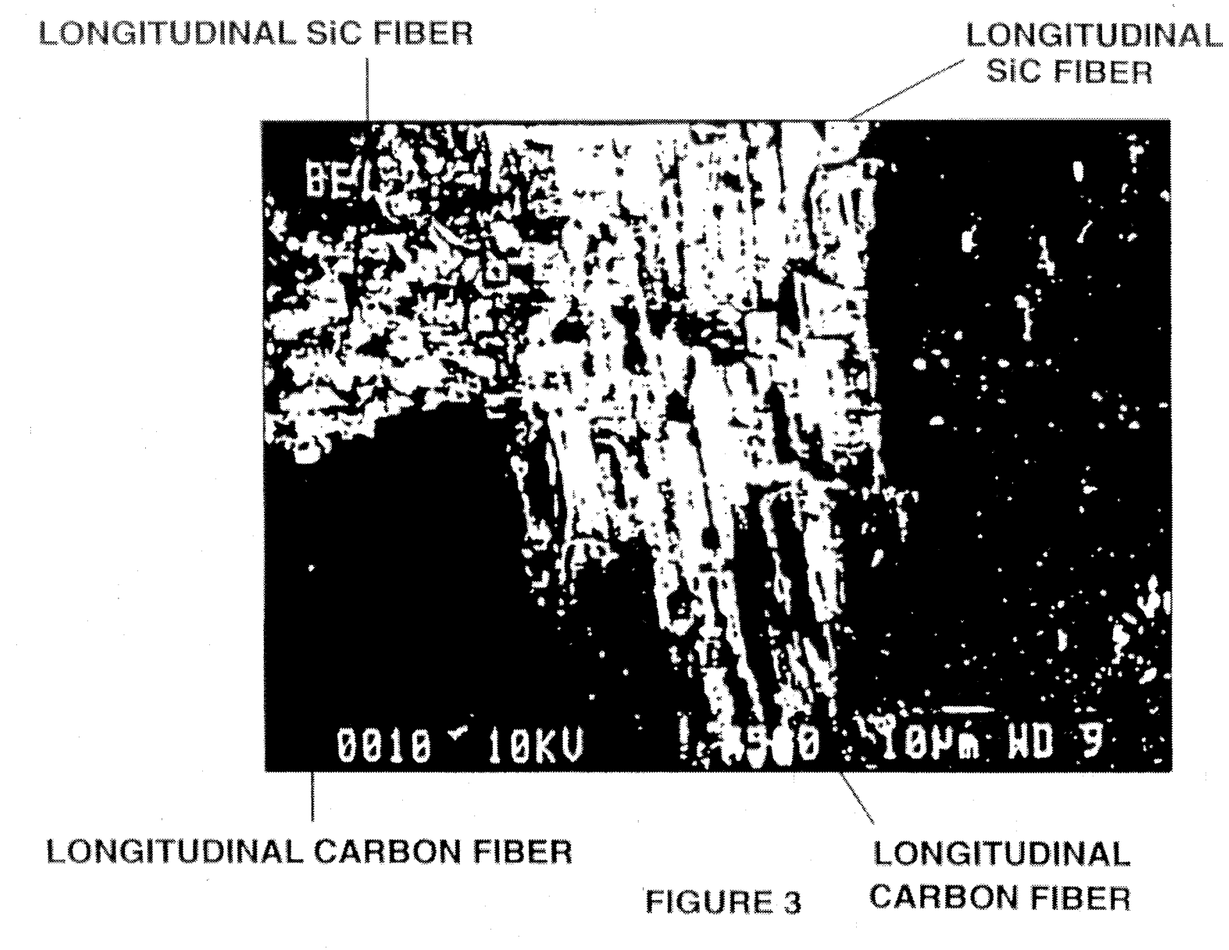

FIG. 3 depicts microstructural views of silicon carbide-silicon carbide/carbon-carbon composite material magnified 500×. Also additional examination of FIG. 3 points out that the extent of the transition going from carbon (which is black in color) and silicon carbide (which is white in color) is considerably less than 0.5 micrometers.

Figure 4:
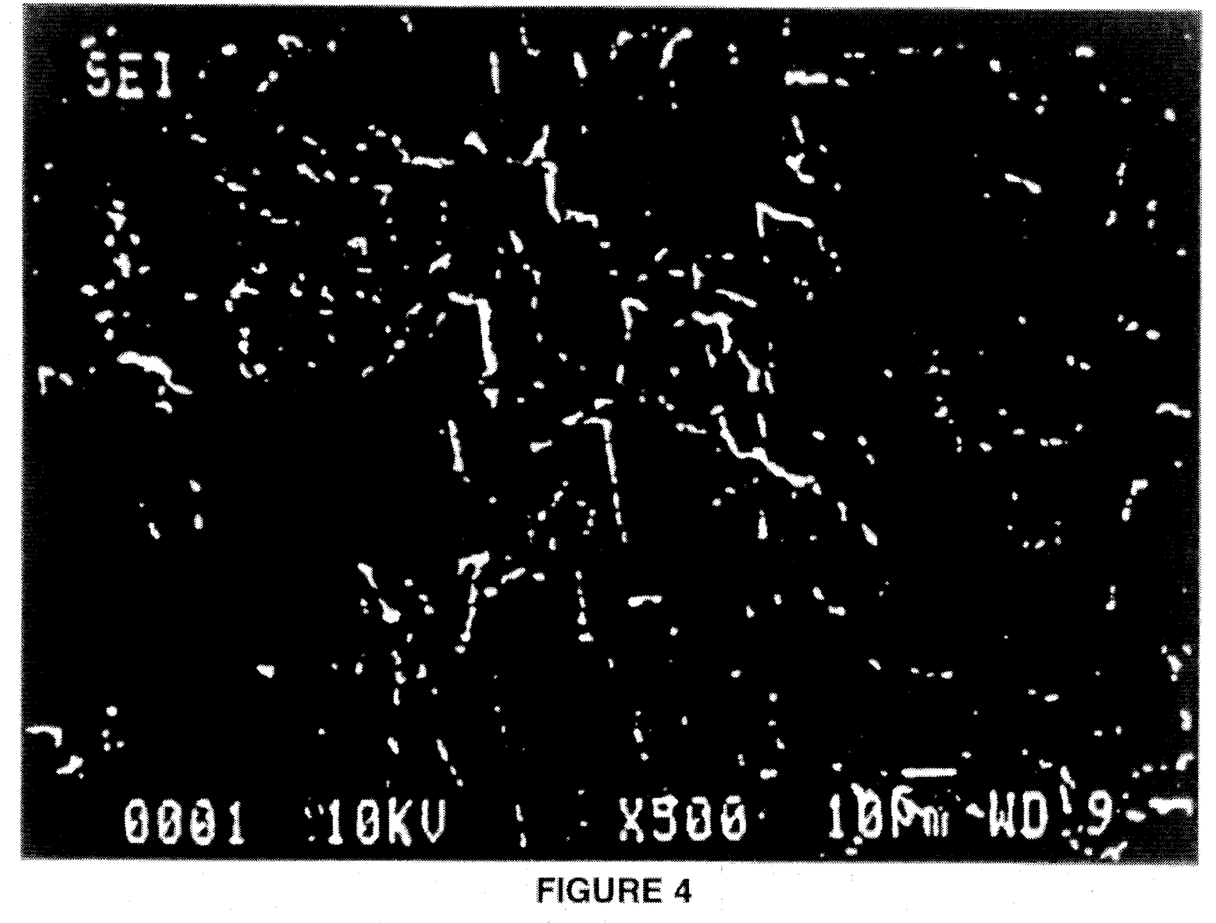
FIGS. 4 and 5 depict the microstructural views of silicon carbide-silicon carbide/carbon-carbon composite material magnified 500×.
Figure 5:
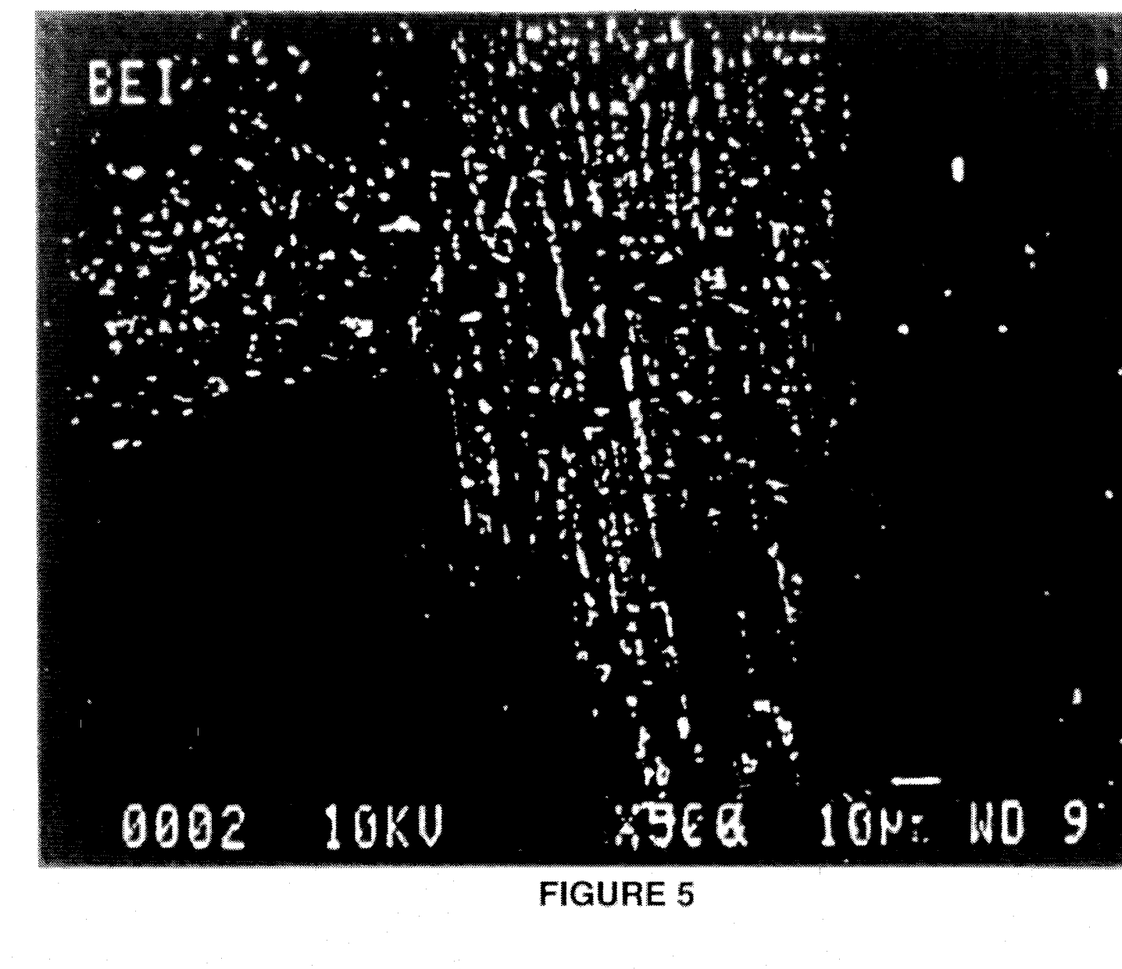

Microstructural views of silicon carbide-silicon carbide/carbon-carbon composite material magnified 500× are depicted in FIGS. 4 and 5.

Figure 6:
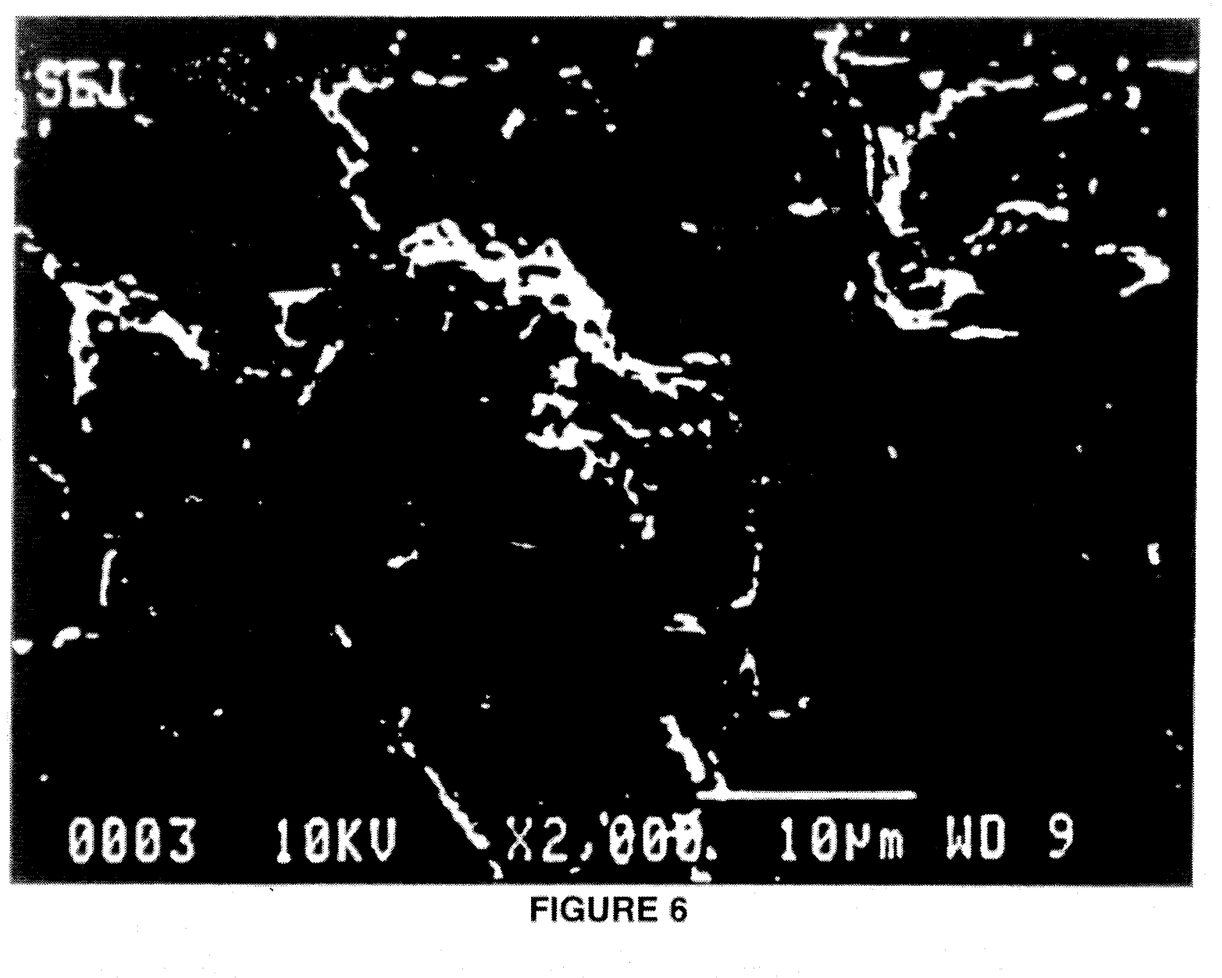
FIGS. 6,7 8, and 9 depict the microstructural view of silicon carbide-silicon carbide/carbon-carbon composite material magnified 2000× to show conversion fronts (low and high selectivity).
Figure 7:
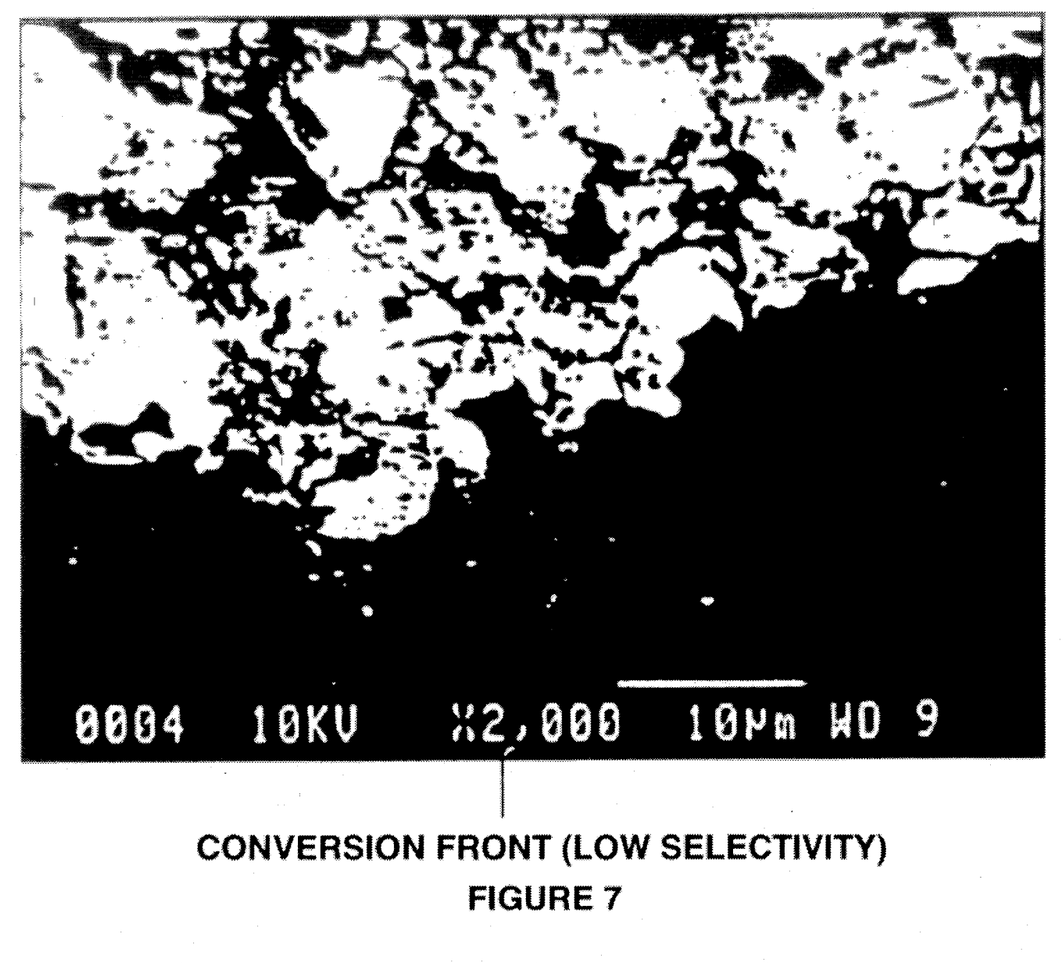
Figure 8:
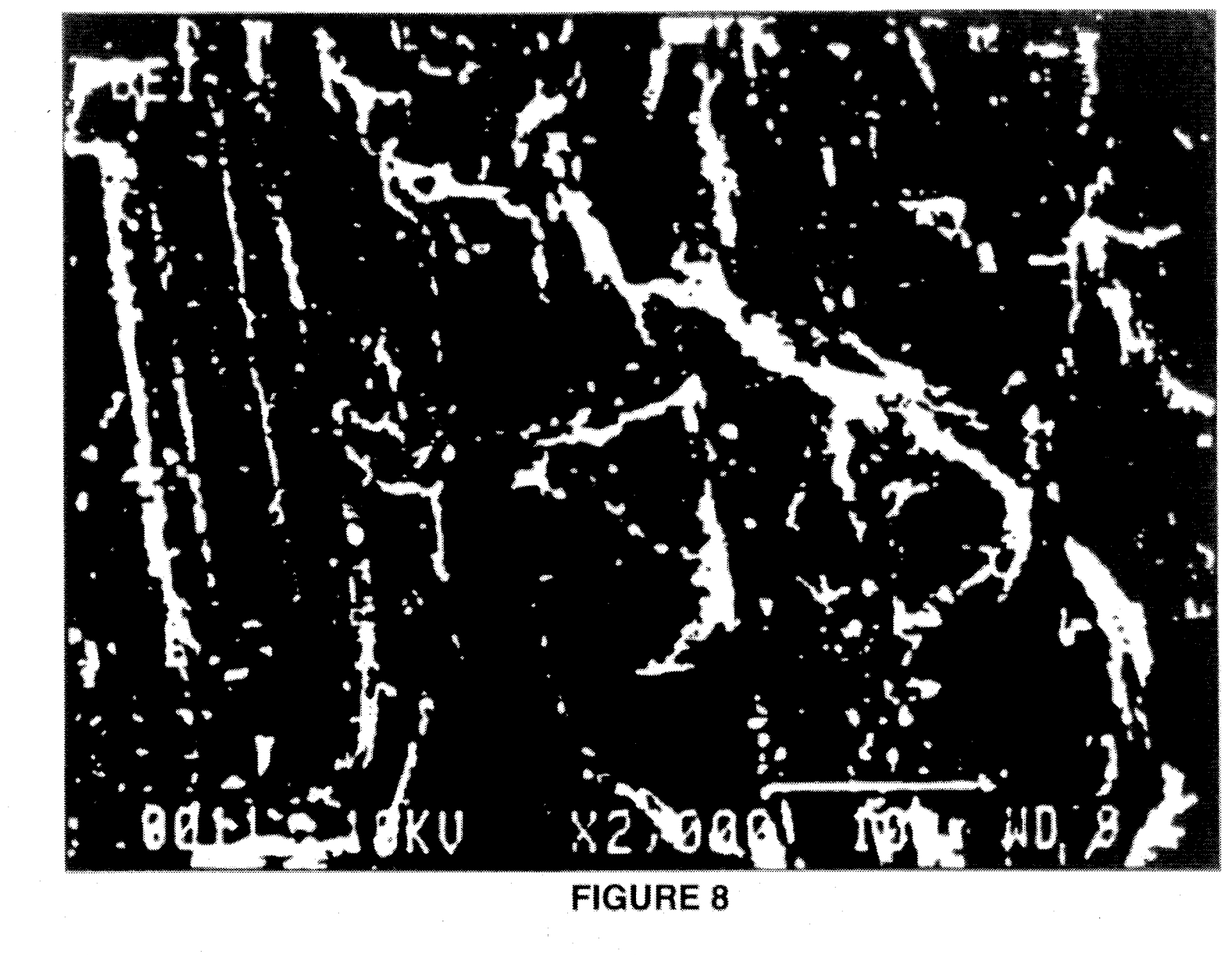

Examination at 2000×, as seen in FIGS. 6 and 8, for the conversion of the carbon fiber and matrix into a composite structure, composed of silicon carbide, can be seen with even greater clarity. FIG. 7 depicts the front with low selectivity, while FIG. 9 depicts the conversion front with high selectivity.

In the case of carbon-carbon composite materials which contain a higher percentage of graphitic carbon at the surface than in the fiber core, a highly selective carbon conversion to silicon carbide occurs in the transverse fiber orientation. Comparison of the views, shown in FIGS. 10–13 magnified 10,000×, show that the silicon monoxide vapor had diffused around the graphite carbon fibers, and, thereby, resulting in converting the matrix into silicon carbide before the conversion of the fiber. The differential selective conversion resulted in a silicon carbide-silicon carbide layer that was well anchored to the underlying carbon-carbon composite because the converted layer was found to be difficult to remove.

Since no microcracking was observable at the interface of the conversion front, the selective nature of the conversion reaction could be used to form highly erosion-resistant materials, such as, graphite fiber-silicon carbide matrix composite materials from graphite fiber-carbon matrix composite materials.

Since the graphite fiber and the silicon carbide matrix are both erosion-resistant, the graphite fiber in the composite structure can be so oriented to conduct heat away from the eroding surface, thereby lowering the temperature of the eroding surface, and enhance the erosion-resistant characteristics of the composite structure.

The conversion reaction is accomplished in a reaction chamber provided with means for closely controlling the reaction temperature from about 1500° C. to 1700° C. where exposure of the carbon-carbon composite material with silicon monoxide converts the carbon to silicon carbide with the release of carbon monoxide from the near surface area during a conversion of the composite material. A continuous reaction can be achieved by controlling a movable belt through a reaction chamber to provide the desired exposure time with reactant silicon monoxide.

The depth of conversion of the near surface of a carbon-carbon composite material for the nozzle throat area of a rocket nozzle ranged from about 50 mils to about 100 mils. This depth of conversion is achieved in a reaction time period from about 30 to 60 minutes at 1700° C. After reaction time is completed, the reaction chamber is purged to remove by-products and unreacted reactant, silicon monoxide. For a continuous operation the reactant, silicon monoxide, concentration can be adjusted by monitoring the vapor phase concentration of reactant in a transit zone for reaction at the predetermined time to achieve the desired depth of carbon-carbon to silicon carbide conversion.

The method of this invention is particularly attractive for converting the throat section and outer surface area of interceptor rocket motor nozzles which are subjected to high temperature and exhaust gases which cause erosion in conventional nozzle areas which have not been subjected to conversion method.

Potential, most promising commercial application for the hybrid material is in the manufacture of automobile engine pistons because it offers the following advantages over aluminum pistons: the lesser thermal expansion of the hybrid materials would allow for a tighter fit in the cylinder bore; a tighter fit would reduce the amount of noise or piston slap the engine makes following a cold start; less piston-to-cylinder-wall clearance would, also, prevent rings from twisting in the ring grooves resulting in minimal ring wear; reduced ring wear would increase engine life because cylinder compression pressures would remain higher for a longer time; and when rings do their job effectively, the cylinders create less blow-by gases, thereby lowering emission levels.

I claim:

1. A method of differential conversion of an exposed outer surface of a carbon-carbon composite material into a silicon carbide-hybridized carbon-carbon to provide a dense and chemically-resistant outer surface, said method comprising:

(i) providing a carbon-carbon composite material with an exposed outer surface for said conversion, said carbon-carbon composite material selected from the group consisting of graphite carbon fiber-carbon matrix material, carbon fiber-carbon matrix material, and carbon-carbon matrix material;

(ii) providing silicon monoxide vapor prepared by the chemical reaction as follows: Si (liquid)+$SiO_2$ (gaseous)→2 SiO (vapor), said silicon monoxide vapor having a concentration;

(iii) exposing said carbon-carbon composite material to said silicon monoxide vapor in a reaction chamber at a temperature from about 1500° C. to about 1700° C. and a time period from about 30 to about 60 minutes to infiltrate said silicon monoxide into said carbon-carbon composite material wherein said infiltration occurs by the following reaction: 2SiO (vapor)+2C (solid)→SiC (solid)+CO (gaseous) to thereby achieve differential conversion with a conversion depth from about 50 to 100 mils, said conversion depth for said carbon-carbon composite material controlled by the concentration of silicon monoxide vapor;

(iv) purging said reaction chamber of by-products of reaction and of any unreacted silicon monoxide;

(v) cooling said carbon-carbon composite material; and (vi) removing said carbon-carbon composite material.

2. The method of claim 1 wherein said differential conversion increases the density of said exposed surface of the carbon-carbon composite material from 1.45 g/cc 3.21 g/cc.

3. The method of claim 1 wherein said carbon-carbon composite material is a graphite fiber-carbon matrix material which has a higher percentage of graphitic carbon fibers at the surface, said graphitic carbon fibers having a transverse fiber orientation.

4. The method of claim 3 wherein said temperature is about 1700 ° C.

\* \* \* \* \*